United States Patent

[11] 3,590,634

| [72] | Inventors | Raphael A. Pasternak<br>San Mateo;<br>Jan F. Schimscheimer, Cupertino, both of, Calif. |
|---|---|---|
| [21] | Appl. No. | 821,905 |
| [22] | Filed | May 5, 1969 |
| [45] | Patented | July 6, 1971 |
| [73] | Assignee | Stanford Research Institute<br>Menlo Park, Calif. |

[54] INSTRUMENT FOR DETERMINING PERMEATION RATES THROUGH A MEMBRANE
3 Claims, 4 Drawing Figs.

[52] U.S. Cl. .................................................. 73/159, 73/38, 73/64.3
[51] Int. Cl. .................................................. G01n 15/08
[50] Field of Search .................................................. 73/19, 23, 38, 23.1, 64.3; 55/16, 158; 210/22, 321

[56] References Cited
UNITED STATES PATENTS

| 3,248,932 | 5/1966 | Bohrer | 73/64.3 |
| 3,431,772 | 3/1969 | Sunner et al. | 73/38 |
| 3,486,367 | 12/1969 | Whatley | 73/64.3 |
| 3,498,110 | 3/1970 | Brun | 73/38 |

Primary Examiner—Louis R. Prince
Assistant Examiner—Joseph W. Roskos
Attorneys—D. J. De Witt and Gregg and Hendricson ABSTRACT: An instrument for determining permeation rates through a membrane having a permeation cell with upstream and downstream compartments arranged to hold a membrane therebetween, a line for continuously passing a gaseous permeant to the upstream cell compartment and from thence to the atmosphere, a line for passing a current of a carrier gas first to the downstream cell compartment and then to a permeant detector associated with a recorder, a bypass line for sending the carrier gas around the downstream compartment, as controlled by a valve in the line, and a heater for making controlled variations in the temperature of the permeation cell during the course of any given permeation rate test.

INVENTORS
RAPHAEL A. PASTERNAK
JAN F. SCHIMSCHEIMER
BY D. J. de Witt
ATTORNEY

FIG. 4
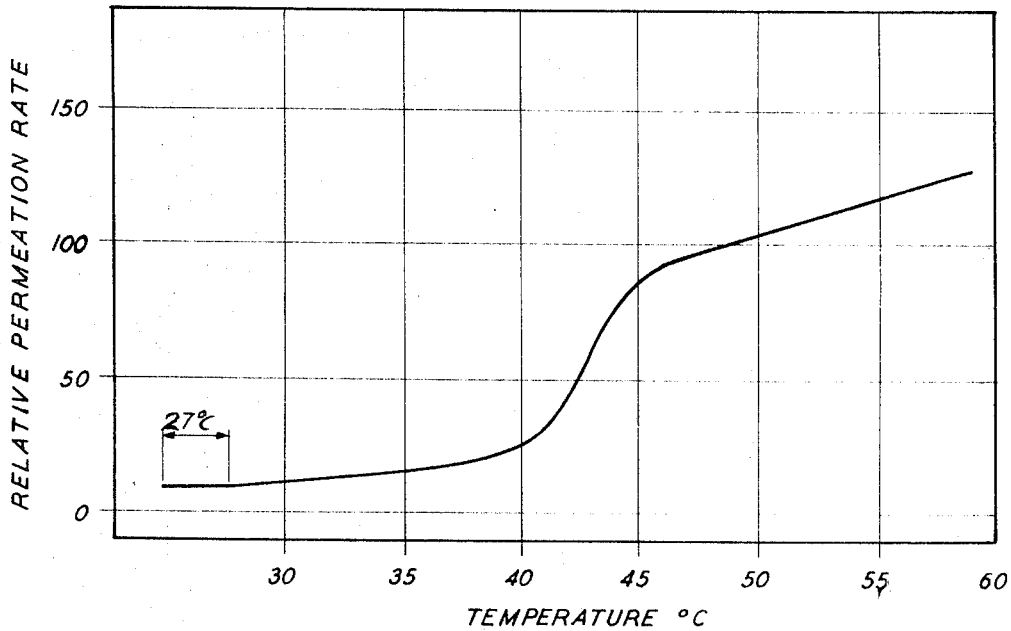
STEADY STATE PERMEATION OF $CO_2$ THROUGH A
3 MIL VULCANIZED GUTTA-PERCHA MEMBRANE
TEMPERATURE SCANNING RATE ABOUT 0.5°C/MININIMUM
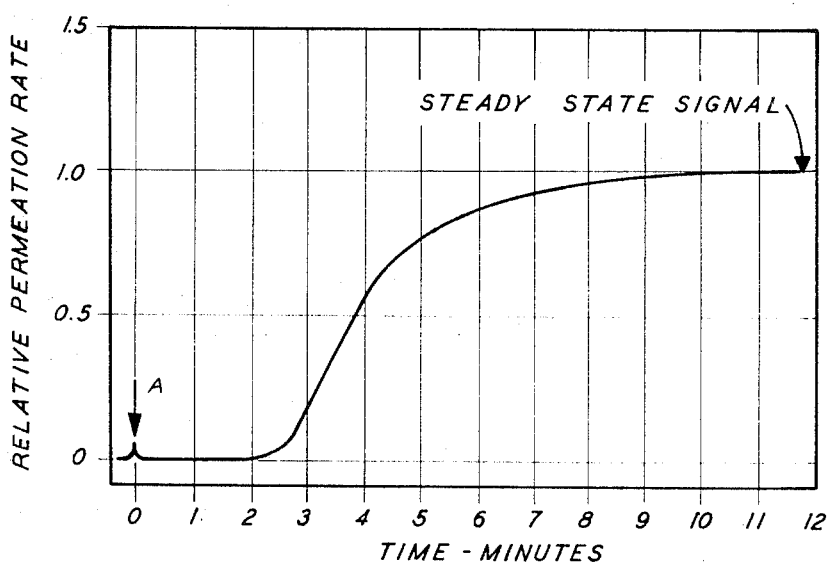
PERMEATION RATE OF HEXANE THROUGH 3.5 MIL
POLYETHYLENE MEMBRANE AT 25°C
FIG. 3

3,590,634

INSTRUMENT FOR DETERMINING PERMEATION RATES THROUGH A MEMBRANE

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

In the classical approach to permeation studies, a pressure differential is established across a membrane and the pressure in the downstream volume is measured as a function of time. After a gradual rise, the pressure increases linearly with time, when steady-state permeation is established. This method has several disadvantages; for example, it requires mechanical support for the membrane if the latter is not to be damaged, as well as the use of vacuum-tight seals. Another limitation of the method is that the entire amount of permeation from the beginning to the end of the test is measured, thus making it impractical to make a detailed analysis of transient permeation rates or to assess the significance of time and temperature on said rates. Further, the methods based on the use of a vacuum or positive pressure differential are not sufficiently rapid or sensitive for present day needs. For example, many of the various plastic films currently in use have extremely low gas or liquid transmission rates, and the accurate measurement thereof becomes increasingly difficult.

It is an object of this invention to provide an improved instrument for measuring permeation rates which operates with the same (atmospheric) pressure on each side of the film or other membrane under study and which permits the continuous measurement of permeation rates. A further object is to provide an instrument of this character which can rapidly be checked for leaks past the membrane and which permits checking membranes for pinholes. A still further object is to provide an instrument which is adapted to be used in the measurement of extremely low permeation rates, said rates being so small in some cases as to require an induced buildup or accumulation of the permeant in a particular increment of carrier gas fed to the detector for analysis.

SUMMARY OF THE INVENTION

The present invention is based on the provision of an improved permeation-detection instrument which measures the rate of passage of a gaseous or liquid permeant through an unsupported membrane. The instrument is one in which a supply of the permeant under atmospheric pressure is passed through or otherwise maintained in the upstream compartment of a permeation cell, while a carrier gas is continuously fed, at atmospheric pressure and at a controlled, even rate, through the downstream compartment of the cell, said compartments being separated by the membrane under study. The carrier gas picks up any permeant present in said compartment which has diffused through the membrane and then passes to a permeant detector associated with a data-recording device. The temperature of the cell may be controlled so as to permit the use of a range of permeation temperatures during any given test; for example, the temperature can be raised or lowered continuously or stepwise as the test is continued. The versatility of the instrument is greatly enhanced by the provision of a bypass line which serves to shunt or otherwise carry the stream of carrier gas around the downstream cell compartment during any period in which said compartment is closed off from the rest of the system.

More particularly, the instrument is one wherein a permeant gas line, arranged for connection with a suitable source of permeant gas supply, leads into the upstream cell compartment, the gas normally being continuously fed through this line, under atmospheric pressure, for contact in said compartment with the horizontally disposed membrane which is tightly clamped into position and sealed from the atmosphere. All the permeant gas introduced into the cell except the small amount passing through the membrane exits from the upstream compartment to the atmosphere. The term "gas," as employed herein and in the appended claims in connection with the permeant, is intended to include gases and vapors, as well as mixtures of one or both thereof.

To accommodate a liquid permeant, other receiving means may be incorporated in the cell wall which permit the desired amount of the test liquid to be injected directly into the upstream cell compartment where it remains as a liquid layer overlying the membrane during the period of the test. It may here be noted that a carrier gas line also leads to the upstream compartment, and by passing carrier gas through this line at the end of the test, any gas or liquid remaining in the cell can readily be swept out of the unit. This frees the instrument for further tests with the same membrane without first having to dismantle the cell.

The carrier gas line leads from a source of supply into the downstream compartment of the cell, while additional lines for this gas also lead to the upstream compartment (as noted above) and optionally to the membrane-sealing area to provide a barrier to the possible entrance of extraneous gases into the downstream cell compartment past the membrane-sealing zone. The carrier gas, which is normally helium, is fed under substantially atmospheric pressures, and at a controlled, constant rate, into the downstream cell compartment where it sweeps up the permeant present therein and carries it through another line leading from the cell to the permeant-detection and data-recording portions of the apparatus. However, in some cases the stream of carrier gas is periodically diverted from the downstream compartment of the cell as it is fed through a bypass line to the detector. This practice is followed, for example, when testing the unit for the presence of air leaks into the cell past the membrane seal. Thus, if momentary diversion of the carrier gas through the bypass does not produce a change in the recorder signal as compared with that obtained when the gas is passed in the normal fashion through the downstream compartment, then it may be concluded that no leak is present. In another application, periodic diversion of the carrier gas through the bypass line is critically important when dealing with permeants which diffuse through the membrane at extremely low rates. In the latter case, shunting of the carrier gas through the bypass line permits the permeant to collect in the closed-off, downstream cell during any period of carrier gas diversion, following which the carrier gas stream is switched back through the cell. The immediately ensuing amount of permeant detected represents that which diffused through the membrane during the bypass time interval, thereby providing a means for obtaining an amplified signal relative to the steady-state signal.

The instrument incorporates temperature-regulation means which permit permeation measurements to be made at temperatures varying over a wide range. The operator is thus provided with means for obtaining either a stepwise or a continuous temperature-permeation profile of the membrane for any gaseous or liquid permeant.

The nature of the permeation detector employed is not critical to this invention and any appropriate instrument can be used which is known to be adapted to the purpose. For example, the detector instrument employed can be a thermal conductivity or flame-ionization instrument or a radioactive counter. With permeation gas mixtures a gas chromatographic column can also be employed into which the carrier gas stream can be diverted for brief time intervals and the peaks characteristic for the components of the permeating mixture are recorded. The data provided by the detector and recording instruments employed can be correlated with that obtained from samples of known composition to obtain the desired absolute permeation rates and coefficients.

DESCRIPTION OF PREFERRED EMBODIMENTS

For a better understanding of the present invention, reference is had to the following specific description when read in conjunction with the figures of the accompanying drawings wherein:

FIG. 3 is a graph showing the relative permeation rate of hexane through a polyethylene membrane as a function of time; and FIG. 4 is a graph showing the relative permeation rate of carbon dioxide through a guttapercha membrane as a function of temperature.

Figure 1:
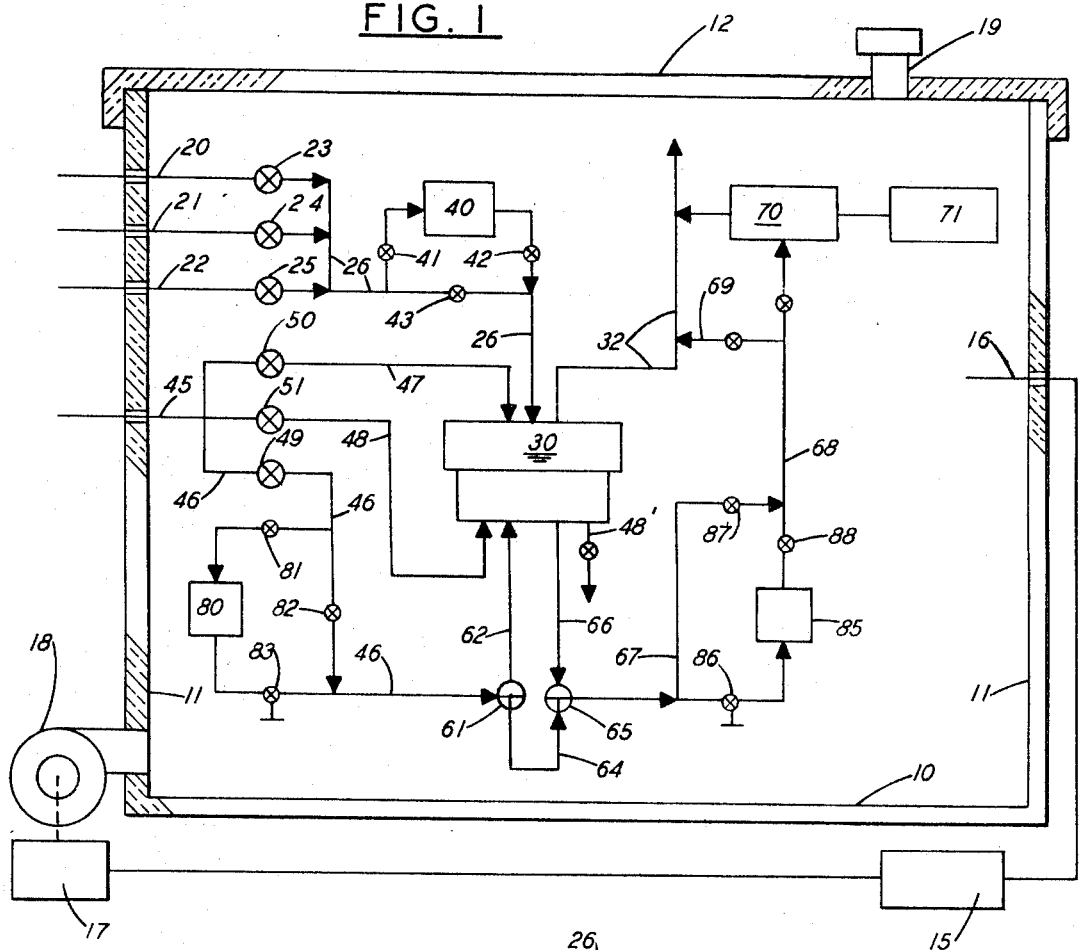
FIG. 1 is a generally schematic view of an instrument embodying features of this invention.

Referring now to FIG. 1, there is shown an instrument having a bottom 10, enclosing sidewalls 11 and a removable top 12. The temperature within the enclosed instrument can be regulated and programmed by means of a thermostat or control device 15 having associated timing and thermostat means, including a sensor element 16. The temperature control device 15 is connected with an appropriate source of heat, or of both heat and coolant, whereby the temperature within the instrument, and hence that of the cell, can be regulated as desired. In the embodiment shown in FIG. 1, the device 15 is connected with an air source 17 which may be heated or cooled as necessary, the resulting air of the controlled temperature being blown into the interior of the instrument by means of a fan 18. Provision is made to exhaust air from the instrument through top vent 19. In another embodiment (not illustrated), heating coils and a fan can be located within the body of the instrument to permit the desired heating action.

Shown entering a sidewall 11 are alternative permeant supply gas lines 20, 21 and 22 each provided with a microvalve, as indicated at 23, 24 and 25, respectively. These lines collectively comprise the permeant manifold of the instrument, with the particular gas or mixture of gases chosen being taken through line 26 into the upstream compartment 27 of a cell 30 shown more particularly in FIG. 2. Permeant gas so introduced which does not pass through membrane 31 exhausts to the atmosphere through line 32. At the option of the operator, the permeant gas passing to the cell may be passed through a humidifier 40 by making appropriate settings of valves 41, 42 and 43 in the associated lines.

Also entering through a side 11 of the instrument is a carrier gas supply line 45 which connects with branch lines 46, 47 and 48 provided with microvalves 49, 50 and 51 permitting the carrier gas to be passed through one or more of said branch lines as the test continues. Line 46 serves to carry a supply of the helium or other carrier gas, at a controlled, constant flow rate governed by the setting of microvalve 49, to a three-way valve 61 which, depending on its setting, can direct the gas either through line 62 into downstream cell compartment 63 or into a bypass line 64 leading to a second three-way valve 65. When the carrier gas is being directed into cell compartment 63 it picks up permeant gas or vapor present therein and carries it through line 66 to said valve 65 and thence through lines 67 and 68 to a permeant detector instrument 70 connected to a data-recording instrument 71 which displays data relative to the content of permeant in the carrier gas stream, as detected by instrument 70. When the carrier gas is not passing into the cell but is instead directed through bypass line 64 and lines 67 and 68 to detector 70, the downstream cell is effectively closed off from communication with the carrier gas by making the appropriate settings of valves 61 and 65.

When the carrier gas is to be provided with moisture, it may be directed into the humidifier unit 80 by making suitable settings of valves 81, 82 and 83 in the associated lines. Again, the carrier gas passing through valve 65 on the way to detector unit 70 may, if desired, be passed through a dehumidifier unit 85 by making suitable settings of valves 86, 87 and 88. A line 69 is provided through which the carrier gas stream may be vented to the atmosphere via line 32 when this stream is not to be sent to detector 70.

Figure 2:
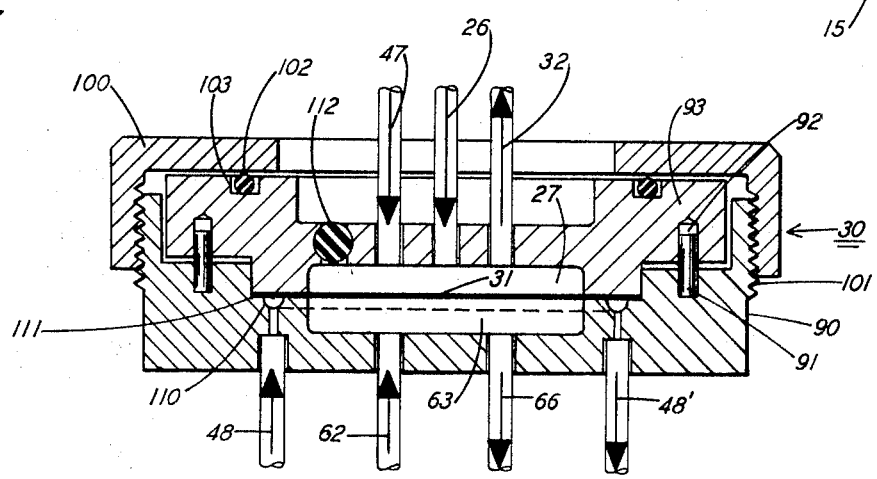
FIG. 2 is an enlarged central sectional view taken in a vertical plane through the permeation cell shown in outline in FIG. 1.

Referring now to FIG. 2, there is shown a central sectional view taken in a vertical plane of the permeant cell 30 which is shown in outline in FIG. 1. This cell, having an overall disclike configuration, is made up of a lower member 90 carrying pins 91 which mate with corresponding pinholes 92 in an upper cell member 93 as said members are brought together to confine the test membrane 31 which separates the upstream and downstream cell compartments 27 and 63 cut in the opposed faces of cell members 90 and 93, respectively. The latter members are brought tightly together, thereby locking the membrane into position and sealing it from contact with the atmosphere, as a nut 100 is screwed into place about threads 101 on the upper margin of member 90. Turning nut 100 forces upper cell member 93 firmly against lower cell member 90 along those opposing surfaces which are in contact with membrane 31. This downward motion imparted by nut 100 to member 93 is communicated through ball bearings 102 contained in a race 103 in the upper surface of said member. An annular groove 110 is cut in the upper face of cell member 90 about the downstream compartment 63. Carrier gas may be directed through line 48 into said groove, under pressure if desired, so as to provide an additional barrier to the entrance of air into the downstream compartment past the seal line 111 where the membrane is clamped between the respective upper and lower cell sections. Carrier gas so admitted into groove 110 can be discharged through line 48', and pressure can be maintained in said groove by closing the valve in the latter line.

A rubber septum injection port 112 is provided in the upper wall of cell section 93 through which a liquid permeant can be readily injected into compartment 27. This port seals itself as soon as the injection needle is withdrawn, thereby keeping out the atmosphere from this compartment.

The manner of operation of the instrument can be illustrated by the several novel usages thereof, as described below, wherein the reported data are obtained under the following conditions. The flow rate of the helium carrier gas is 0.5 ml./sec., and the flow rate of the permeant gas, as well as that of any helium supplied to the upstream compartment, are of the same magnitude, though not carefully controlled. The detector is a thermal conductivity cell, and the signal is recorded with a potentiometric recorder having a maximum sensitivity of $1.4 \times 10^{16}$ v./mm. deflection. The signal observed is proportional to the concentration of permeant in the gas stream. Calibrations are required to convert the signal to absolute concentration; a helium-$CO_2$ mixture of known composition is used for the $CO_2$ calibration, while for hexane, its vapor in the carrier gas stream is condensed in a cold trap for a known time interval and the weight of condensate compared with the signal. For other gases, the calibration factor is derived from that observed for $CO_2$ and using the values for the relative sensitivity of the detector for different gases or vapors as obtained from the literature. The permeation rate $R$ is given by $R = k \cdot S \cdot f$, where $k$ is the calibration factor, $S$ is the signal and $f$ the flow rate of the carrier gas. The permeation coefficient can then be derived from this rate by standard procedures.

Permeation Rate Measurement by Accumulation of Permeant

If the permeation rates are too small to produce a continuous signal of noticeable magnitude, a readily measurable signal can be generated by isolating the permeation cell for a fixed time interval during which the helium stream is directed through the bypass line, and by then switching the helium stream back through the downstream cell compartment to pick up the accumulated vapor. This generates a recorded peak having an area which can be determined by graphical or numerical integration and which is proportional to the amount of accumulated permeant. This procedure has been tested for steady state permeation of nitrogen at 52° C. through a 1.2 mil polyethylene membrane. Typical data for nitrogen are shown in the following table:

| Time (sec.) | Peak high (cm.) | Peak area (cm.²) | Area/sec. |
|---|---|---|---|
| 0 | 0.5 | Continuous signal | |
| 50 | 5.1 | 7.5 | 0.149 |
| 100 | 9.8 | 14.4 | 0.144 |
| 200 | 17.7 | 29.8 | 0.149 |
| 300 | 24.6 | 43.0 | 0.143 |

It is seen from the above data that the proportionality between time and peak area is well satisfied, as expected for steady state permeation. The absolute permeation rates can be derived from the peak area by appropriate calibration with a gas of known composition, as indicated above. In the present system, accumulation of the permeant for 100 seconds produces a peak which is higher than the continuous flow signal by more than a factor of 10. By reducing the cell volume and increasing flow rate of the carrier gas, this factor can be increased still further.

Permeation of Liquids

In studying the permeation of liquids in contact with the membrane, the base line of the instrument is established by passing helium on either side of the membrane. The helium flow through the upstream compartment is then stopped and a small amount (e.g., 1 cc. or less) of the liquid permeant, at the cell temperature, is introduced into the upstream cell compartment through a rubber septum injection port by means of a syringe. The liquid permeates through the membrane, enters the carrier gas in the downstream compartment as a vapor, and produces a continuous signal. A typical run with a 3.5 mil polyethylene membrane and hexane at 25° C. is shown in FIG. 3 of the drawings. Hexane is admitted at point A (in FIG. 3) and steady-state permeation is indicated as being reached in about 10 min., the signal values being expressed as fractions of the final steady-state signal. After steady-state permeation is reached, the temperature of the instrument is changed and the steady-state permeation rate at the new temperature is observed. The relative steady-state permeation rates ($S_r$) at a number of temperatures are given in the following table:

| | Temperature, ° C. | | | | | |
|---|---|---|---|---|---|---|
| | 25 | 30 | 35 | 40 | 45 | 52 |
| $S_r$ | 1 | 1.29 | 1.64 | 2.22 | 2.73 | 3.67 |

At the conclusion of the foregoing test, the helium stream is reestablished in the upstream compartment and the liquid is removed by evaporation. Complete removal of the permeant from the membrane is indicated by the disappearance of the signal, i.e., by its return to the base line. The same membrane can be used for another series of tests.

Determination of the Temperature Dependence of Permeation by a Scanning Procedure When steady-state permeation of a gas through a polymer membrane is established at one temperature and the temperature is then slowly and continuously increased, the signal versus time curve represents essentially the temperature dependence of the steady-state permeation rate. Thus, in one run, $CO_2$ permeation through a 3 mil vulcanized guttapercha membrane is tested as the temperature is raised at a rate of 0.5° C. per minute. The permeation data so obtained are shown in FIG. 4 of the drawings. It will be observed that below 40° C. and above 45° C. the permeation rate rises only slowly. However, it increases rapidly between these temperatures. This large change in permeation rate is associated with the known transition of guttapercha from crystalline to amorphous state at about 43° C. This example illustrates the great potential of the instrument for the study of transitions in polymers.

Preparation of Mixtures of Two Gases of Well-defined Composition

Gases containing well-defined concentrations of a second gas can be prepared in the instrument. This approach is especially suitable for establishing small concentrations of the second component; it also permits one to make a rapid change of gases and of gas concentrations. The membrane acts essentially as a valve, the conductance of which can be varied at will by changing the cell temperature. The composition of the gas mixture can be controlled also by adjusting the flow rate of the principal gas; other variables are membrane material and thickness.

This concept is tested by introducing $CO_2$, $O_2$, and $N_2$ into helium. Typical data are shown in the following table wherein concentrations of the three gases in the helium stream, obtained by permeation through a 1.2-mil polyethylene membrane at different temperatures, are listed.

| Temperature, ° C. | Concentration (p.p.m.) | | |
|---|---|---|---|
| | $CO_2$ | $O_2$ | $N_2$ |
| 25 | 190 | 44 | |
| 30 | 240 | | 11 |
| 35 | 200 | 60 | |
| 40 | 360 | 70 | 19 |
| 45 | 460 | | 24 |
| 52 | | 90 | 35 |

Although the present invention has been described with respect to particular preferred embodiments thereof, it is not intended to limit the invention to the details of description and illustration. Reference is made to the appended claims for a precise definition of the invention.

We claim:

1. An instrument for determining permeation rates through a membrane comprising a permeation cell having upstream and downstream compartments separated by a membrane clamped within the cell, a line for continuously passing a gaseous permeant to the upstream cell compartment and from thence to the atmosphere, a line for passing a current of a carrier gas first to the downstream cell compartment and then to a permeant detector means for effecting a substantially continuous determination of the relative amount of permeant in any carrier gas stream passed through said detector means, and associated with a recorder, a bypass line permitting the carrier gas to be detoured around the downstream compartment as the latter is periodically shut off from the system, and means for making controlled variations in the temperature of the permeation cell while continuously making the aforesaid determination when continuously passing the gaseous permeant to the upstream cell compartment and the carrier gas to the detector via the downstream compartment.

2. An instrument as recited in claim 1 which includes means for injecting a supply of liquid permeant into the upstream cell compartment.

3. An instrument for measuring the permeation rate of a gaseous or liquid permeant through a membrane, said instrument comprising:
   a permeation cell having upstream and downstream compartments arranged to be separated by the membrane under study;
   clamping means for holding said membrane in position within the cell and for sealing the membrane portion separating the cell compartments from contact with the atmosphere;
   permeant-receiving means leading into the upstream cell compartment through which the latter may be provide with permeant during the period of the test, and exhaust means communicating with the atmosphere leading from said upstream compartment;
   a first carrier gas-receiving line leading into the downstream cell compartment, said line incorporating valve means adapted to effect precise control of the rate at which carrier gas, under atmospheric pressure, is passed through said line;
   a second carrier gas-receiving line incorporating valve control means leading into the upstream cell compartment;
   an exit line incorporating valve control means leading from the downstream cell compartment and communicating with detecting means for effecting a substantially continuous determination of the relative amount of permeant in any carrier gas stream passed through said detecting means, and recording means associated with said detection means for displaying the permeant content data so obtained;

means for making controlled variations in the temperature of the permeation cell while continuously making the aforesaid determination of the relative amount of permeant in the carrier gas stream passed through the detecting means; and a bypass line incorporating valve control means and communicating with said first carrier gas line and with said exit line whereby the carrier gas stream may be shunted around the downstream compartment during any period in which the latter is closed off from the system.